(12) United States Patent
Thomsen, III (10) Patent No.: US 10,600,522 B2
(45) Date of Patent: Mar. 24, 2020

(54) METHOD OF MAKING THIN ATOMIC (Z) GRADE SHIELDS

(71) Applicant: U.S.A. AS REPRESENTED BY THE ADMINISTRATOR OF NASA, Washington, DC (US)

(72) Inventor: Donald L. Thomsen, III, Yorktown, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 39 days.

(21) Appl. No.: 15/949,644

(22) Filed: Apr. 10, 2018

(65) Prior Publication Data

US 2018/0294063 A1    Oct. 11, 2018

Related U.S. Application Data

(60) Provisional application No. 62/483,646, filed on Apr. 10, 2017, provisional application No. 62/624,876, filed on Feb. 1, 2018, provisional application No. 62/624,872, filed on Feb. 1, 2018, provisional application No. 62/484,048, filed on Apr. 11, 2017.

(51) Int. Cl.
| | | |
|---|---|---|
| *G21F 1/08* | (2006.01) | |
| *G21F 7/00* | (2006.01) | |
| *G21F 1/12* | (2006.01) | |
| *H02S 20/00* | (2014.01) | |
| *H02S 30/00* | (2014.01) | |

(52) U.S. Cl.
CPC .............. *G21F 1/085* (2013.01); *G21F 1/125* (2013.01); *G21F 7/00* (2013.01); *H02S 20/00* (2013.01); *H02S 30/00* (2013.01)

(58) Field of Classification Search
CPC ... G21F 1/08; G21F 1/085; G21F 1/12; G21F 1/125; G21F 7/00; H02S 30/00; B64G 1/54
See application file for complete search history.

(56) References Cited

U.S. PATENT DOCUMENTS 2,858,451 A * 10/1958 Silversher ............... G21F 1/125
                                                   250/515.1
3,239,669 A *  3/1966 Weinberger ............. G21F 1/10
                                                    250/519.1
3,924,261 A    12/1975 Kardashian
(Continued)

OTHER PUBLICATIONS

Kim et al, "Controlled Planar Interface Synthesis by Ultrahigh Vacuum Diffusion Bonding/Deposition", J. Mater Res. vol. 15, No. 4, Apr. 2000 (Year: 200).*

(Continued)

*Primary Examiner* — David E Smith
(74) *Attorney, Agent, or Firm* — Jonathan B. Soike; Robin W. Edwards; Helen M. Galus (57) ABSTRACT

A radiation-shielded structural enclosure is formed from layers of material having higher and lower Z (atomic) numbers. The enclosure may be formed from layers of titanium that are bonded to opposite sides of a layer of tantalum. A layer of aluminum alloy may be bonded to at least one of the layers of titanium. The enclosure provides structural support for components disposed inside the enclosure and provides radiation shielding for the components.

25 Claims, 5 Drawing Sheets

(56) References Cited

U.S. PATENT DOCUMENTS

| | | | |
|---|---|---|---|
| 4,795,654 A * | 1/1989 | Teleki | G21F 1/12 |
| | | | 250/515.1 |
| 4,938,233 A | 7/1990 | Orrison, Jr. | |
| 5,416,278 A | 5/1995 | Ostrem | |
| 5,483,100 A | 1/1996 | Marrs et al. | |
| 5,557,142 A | 9/1996 | Gilmore | |
| 5,891,528 A | 4/1999 | Turek et al. | |
| 5,965,829 A * | 10/1999 | Haynes | C22C 32/0047 |
| | | | 420/528 |
| 6,048,379 A | 4/2000 | Bray et al. | |
| 6,256,999 B1 | 7/2001 | Chase | |
| 6,281,515 B1 | 8/2001 | Demeo et al. | |
| 6,459,091 B1 | 10/2002 | Demeo et al. | |
| 6,583,432 B2 | 6/2003 | Featherby et al. | |
| 6,674,087 B2 | 1/2004 | Cadwalader et al. | |
| 6,828,578 B2 | 12/2004 | Demeo et al. | |
| 6,841,791 B2 | 1/2005 | Demeo et al. | |
| 6,893,596 B2 | 5/2005 | Haas et al. | |
| 6,967,343 B2 | 11/2005 | Batten | |
| 7,148,084 B2 | 12/2006 | Strobel et al. | |
| 7,175,803 B2 | 2/2007 | Artig et al. | |
| 7,196,023 B2 * | 3/2007 | Langley | B32B 27/08 |
| | | | 442/131 |
| 7,274,031 B2 | 9/2007 | Smith | |
| 7,476,889 B2 | 1/2009 | Demeo et al. | |
| 7,595,112 B1 | 9/2009 | Cano et al. | |
| 7,718,984 B2 | 5/2010 | Edwards et al. | |
| 7,851,062 B2 | 12/2010 | Hales et al. | |
| 8,234,014 B1 | 7/2012 | Ingle | |
| 8,367,233 B2 | 2/2013 | Hermann | |
| 8,536,684 B2 | 9/2013 | Chen | |
| 8,661,653 B2 | 3/2014 | Thomsen et al. | |
| 10,039,217 B1 | 7/2018 | Thomsen, III et al. | |
| 2003/0147485 A1 * | 8/2003 | Wright | G21C 19/40 |
| | | | 376/272 |
| 2007/0035033 A1 | 2/2007 | Ozguz | |
| 2007/0248866 A1 | 10/2007 | Osenar | |
| 2008/0245978 A1 * | 10/2008 | Yanke | F42B 39/14 |
| | | | 250/515.1 |
| 2008/0249753 A1 | 10/2008 | Wilson et al. | |
| 2009/0272921 A1 * | 11/2009 | Ballsieper | G21F 1/12 |
| | | | 250/515.1 |
| 2010/0086729 A1 * | 4/2010 | Long | B32B 15/08 |
| | | | 428/116 |
| 2012/0273622 A1 * | 11/2012 | Long | B64G 1/423 |
| | | | 244/171.7 |
| 2016/0314862 A1 * | 10/2016 | Kim | G01N 23/223 |
| 2017/0032857 A1 | 2/2017 | Thomsen, III et al. | |

OTHER PUBLICATIONS

Pinedu, S. et al., "Study and Realization of Titanium-Tantalum Junctions Sodaed by High Temperature Diffusion (865-920 C): Influence of Temperature, Time, Pressure and Roughness Parameters on the Mechanical Properties and Optimization of the Welding Conditions," Journal of Less-Common Metals, 1985, pp. 169-196, vol. 109. (Translation attached).

Calvo, F. A. et al., "Diffusion Bonding of Ti—6Al—4V Alloy at Low Temperature: Metallurgical Aspects," Journal of Materials Science, 1992, pp. 391-398, vol. 27.

A Consensus Study Report of the National Academies of Sciences, Engineering, Medicine, Open Source Software Policy Options for NASA Earth and Space Sciences, The National Academies Press, 2018, pp. 1-109.

* cited by examiner

METHOD OF MAKING THIN ATOMIC (Z) GRADE SHIELDS

CROSS-REFERENCE TO RELATED PATENT APPLICATION(S)

This patent application claims the benefit of and priority to U.S. Provisional Application No. 62/483,646, filed on Apr. 10, 2017, entitled, "Method of Making Thin Atomic (Z) Grade Shields"; U.S. Provisional Application No. 62/624,876, filed on Feb. 1, 2018, entitled "Method of Making Thin Atomic (Z) Grade Shields"; U.S. Provisional Application No. 62/484,048, filed on Apr. 11, 2017, entitled, "Method of Making Atomic Number (Z) Grade Small SAT Radiation Shielding Vault"; and U.S. Provisional Application No. 62/624,872, filed on Feb. 1, 2018, entitled, "Method of Making Atomic Number (Z) Grade Small SAT Radiation Shielding Vault". The present application is also related to U.S. Patent Application Publication Nos. 2017/0032857 and 2012/0023737. The contents of the above identified patent applications are hereby incorporated by reference in their entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND

Various types of electronic devices or other such items may be utilized in an environment that includes significant amounts of radiation. One approach is to utilize electronic components that are individually shielded from radiation. These components may be mounted in a larger housing or other structure that does not provide radiation shielding. However, this approach may suffer from various drawbacks.

BRIEF SUMMARY

One aspect of one or more embodiments related to a method of making a radiation-shielded structural enclosure member. The method includes bonding first and second layers, of a first material (e.g., titanium) onto first and second opposite sides, respectively, of a layer of a second material (e.g., tantalum) utilizing, e.g., a high temperature vacuum diffusion bonding process. The method includes securing a layer of third material (e.g., aluminum alloy) to at least one of the first and second layers of the first material, e.g., utilizing a process such as brazing having a lower temperature than the high temperature vacuum bonding process. The process is capable of forming a structural enclosure member having an areal density of at least about 0.80 g/cm$^2$ and a thickness of about 0.11 inches or less. The thickness of the structural enclosure member may be thinner than 0.11 inches (e.g. about 0.080 inches or less). The structural enclosure member may be configured to provide for mounting of electronic cards or other such components. A plurality of the radiation-shielded structural enclosure members may be interconnected to form a shell structure having a radiation-shielded interior space.

Another aspect of one or more embodiments related to relates to a radiation-shielded structure including a shell. The shell includes at first and second layers of a first material (e.g., titanium) bonded to and separated by a second material (e.g., tantalum). The outer shell includes a layer of a third material (e.g., aluminum alloy) covering at least a portion of the one of the first or second layers of the first material. The shell may have an areal density of at least about 0.50 or 0.80 g/cm$^2$, and defines a radiation-shielded interior space.

These and other features, advantages, and objects of the disclosed embodiments will be further understood and appreciated by those skilled in the art by reference to the following specification, claims, and appended drawings.

DETAILED DESCRIPTION

Figure 1:
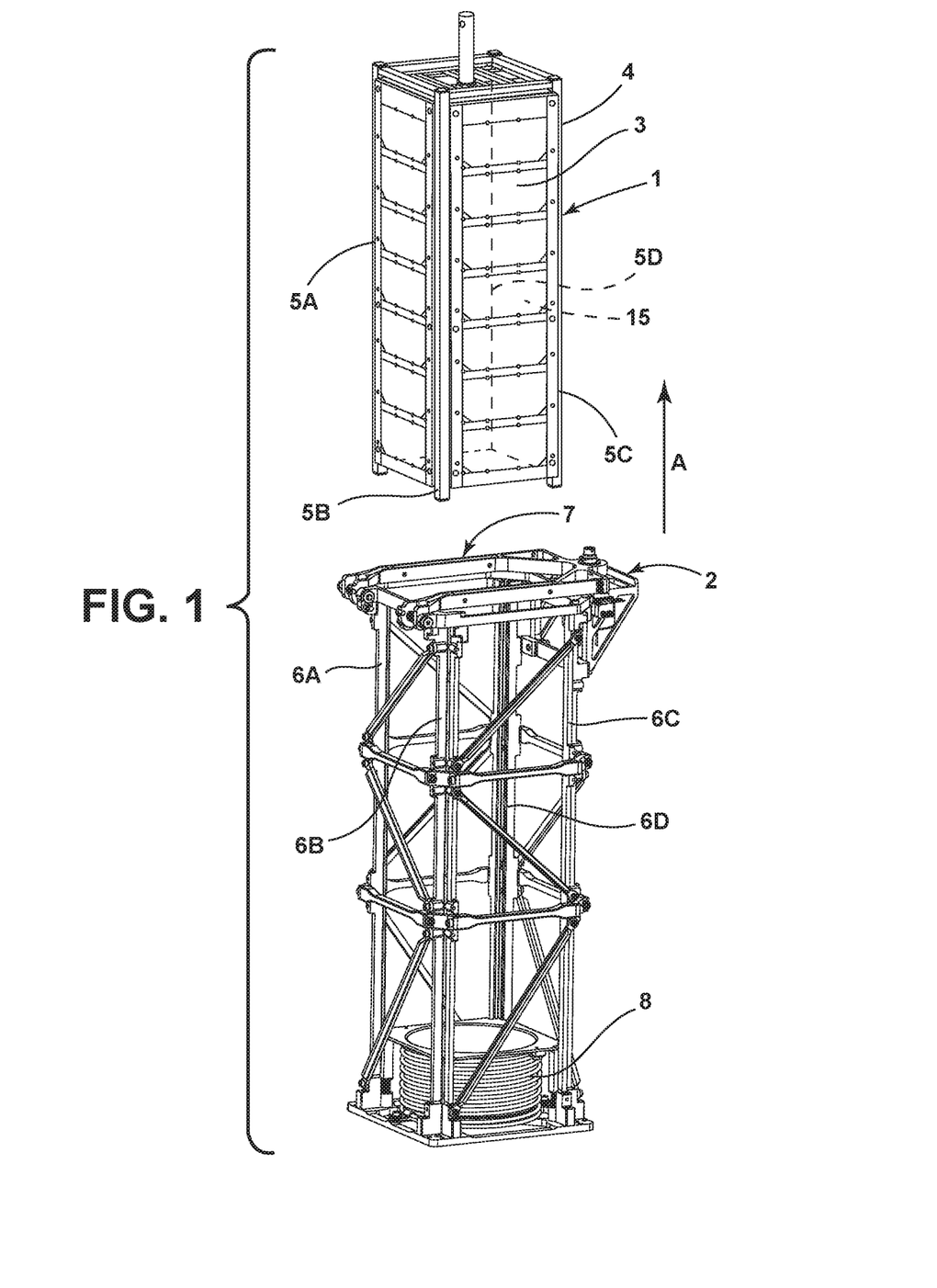
FIG. 1 is a partially exploded isometric view of a radiation-shielded device and a dispenser that may be utilized to support the radiation-shielded device, in accordance with one or more embodiments of the present disclosure.

For purposes of description herein, the terms "upper," "lower," "right," "left," "rear," "front," "vertical," "horizontal," and derivatives thereof shall relate to the device as oriented in FIG. 1. However, it is to be understood that the described embodiment may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

One or more embodiments of the present disclosure relate to the structure and construction of radiation shielding. In some embodiments, radiation shielding includes various arrangements of one or more layers of a lower Z (i.e. lower atomic number or density (g/cm$^3$)) (e.g., aluminum) with one or more layers of a higher Z (i.e. higher atomic number or density) (e.g., titanium and/or tantalum) to provide a required level of radiation shielding. The combination of layers of higher Z material with layers of lower Z material allows radiation shielding to be significantly increased while only marginally increasing weight. As an illustrative example, some embodiments may include two layers of lower Z material(s) separated by and bonded to a layer of a higher Z material. Conversely, some embodiments may include two layers of higher Z material(s) separated by and bonded to a layer of a lower Z material. Some embodiments, may include one or more additional layers bonded to a three layer arrangement. For instance, in one or more embodiments, two layers of a first lower Z material (e.g., titanium) are separated by and bonded to a third layer of a second higher Z material (e.g., tantalum). A fourth layer of a third material (e.g., aluminum) that is lower Z than the first material. Bonding an arrangement of higher and lower Z materials with aluminum are thought to be particularly advantageous for high-radiation applications requiring lightweight structures (e.g., high altitude aircraft). As described in more detail in the following description, different embodiments may utilize various higher and lower Z materials in various arrangements of three or more layers to provide radiation shielding. While embodiments may be primarily described with reference to diffusion bonding of layer of materials, it is recognized that the layers may be joined using other techniques known in the art (e.g., ultrasonic bonding, plasma spraying, and/or chemical vapor deposition).

Figure 2:
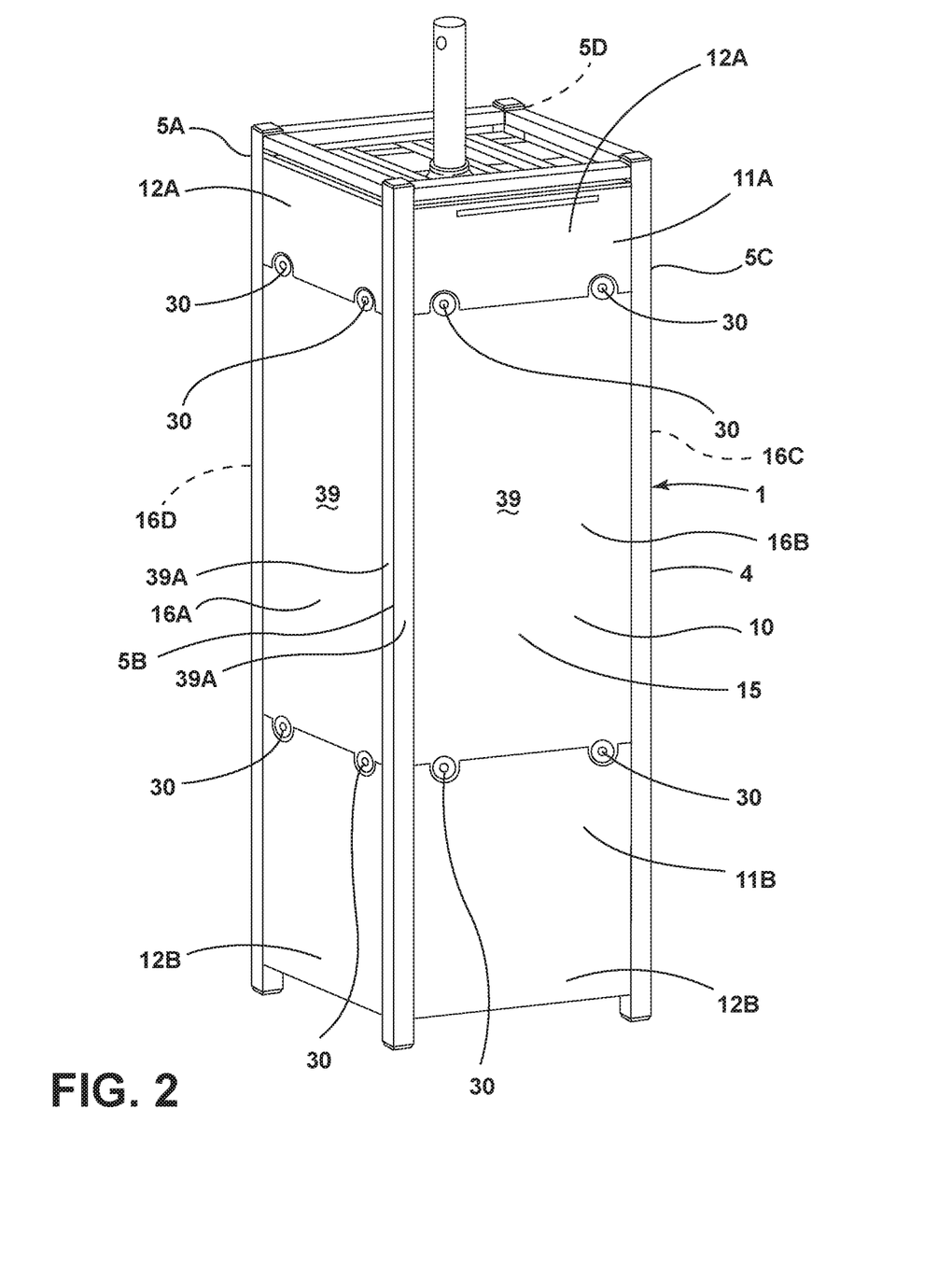
FIG. 2 is a partially schematic isometric view of the radiation-shielded device of FIG. 1.

With reference to FIGS. 1 and 2, a radiation-shielded device 1 is configured to be used in an environment having significant radiation. Radiation-shielded device 1 may be configured to be removably supported inside a dispenser 2 prior to deployment. Radiation-shielded device 1 may include a plurality of solar panels 3 (not shown in FIG. 2) that are secured to a primary structure 4. The radiation-shielded device 1 includes four elongated corners or edges 5A-5D that are configured to slidably engage elongated rails or guides 6A-6D of dispenser 2. The radiation-shielded device 1 may be deployed from dispenser 2 by releasing a retainer 7 such that a resilient member 8 pushes the radiation-shielded device 1 out of dispenser 2 in the direction of the arrow "A." Dispenser 2 may have a standardized construction such that the outer dimensions of the radiation-shielded device 1 cannot exceed predefined limits. As discussed in more detail below, the regions of radiation-shielded device 1 in the areas of elongated corners or edges 5A-5D may be anodized to prevent direct contact between aluminum primary structure 4 and guides or rails 6A-6D.

With further reference to FIG. 2, radiation-shielded device 1 may include a central portion 10, a first end portion 11A, and an opposite end portion 11B. Central portion 10 may include a radiation-shielded vault 15 (see also FIG. 3) that is configured to support electronic devices and other items while protecting the devices from radiation. The ends 11A and 11B may have a construction that provides minimal radiation shielding such that components disposed in the end portions 11A and 11B are exposed to environmental radiation that may exist in the area around radiation-shielded device 1. The radiation-shielded vault 15 may comprise panel or plate members 16A-16D that are interconnected to adjacent panels 12A and 12B by structural connectors such as tabs 31 with openings 32 that receive threaded fasteners 30. As discussed in more detail below, the panels or plates 16A-16D may have layers of high and low Z materials providing "Z-shields" radiation shielding construction. For example, panels/plates 16A-16D may comprise one layer of a lower Z material such as aluminum alloy, and one or more additional layers of a higher Z material such as titanium and/or tantalum to provide a required level of radiation shielding. The layers of high and low Z material of panels 16A-16D significantly lowers the total ionizing dose of radiation. The use of high and low Z materials also provides a relatively thin wall construction that maximizes the internal space within vault structure 15 for a given outer size of radiation-shielded device 1.

Referring again to FIG. 2, the panel or plate members 16A-16D may include a central portion 39 comprising exposed aluminum, and edge portions 39A comprising "hard" anodized aluminum. The anodized aluminum portions 39A prevent direct contact between aluminum alloy layer 40 (FIGS. 4 and 5) and the guides or rails 6A-6D of dispenser 2 (FIG. 1). The anodizing may comprise class III hard anodizing per MIL-A-8625F. It will be understood that the solar panels 3 are not shown in FIG. 2.

Figure 3:
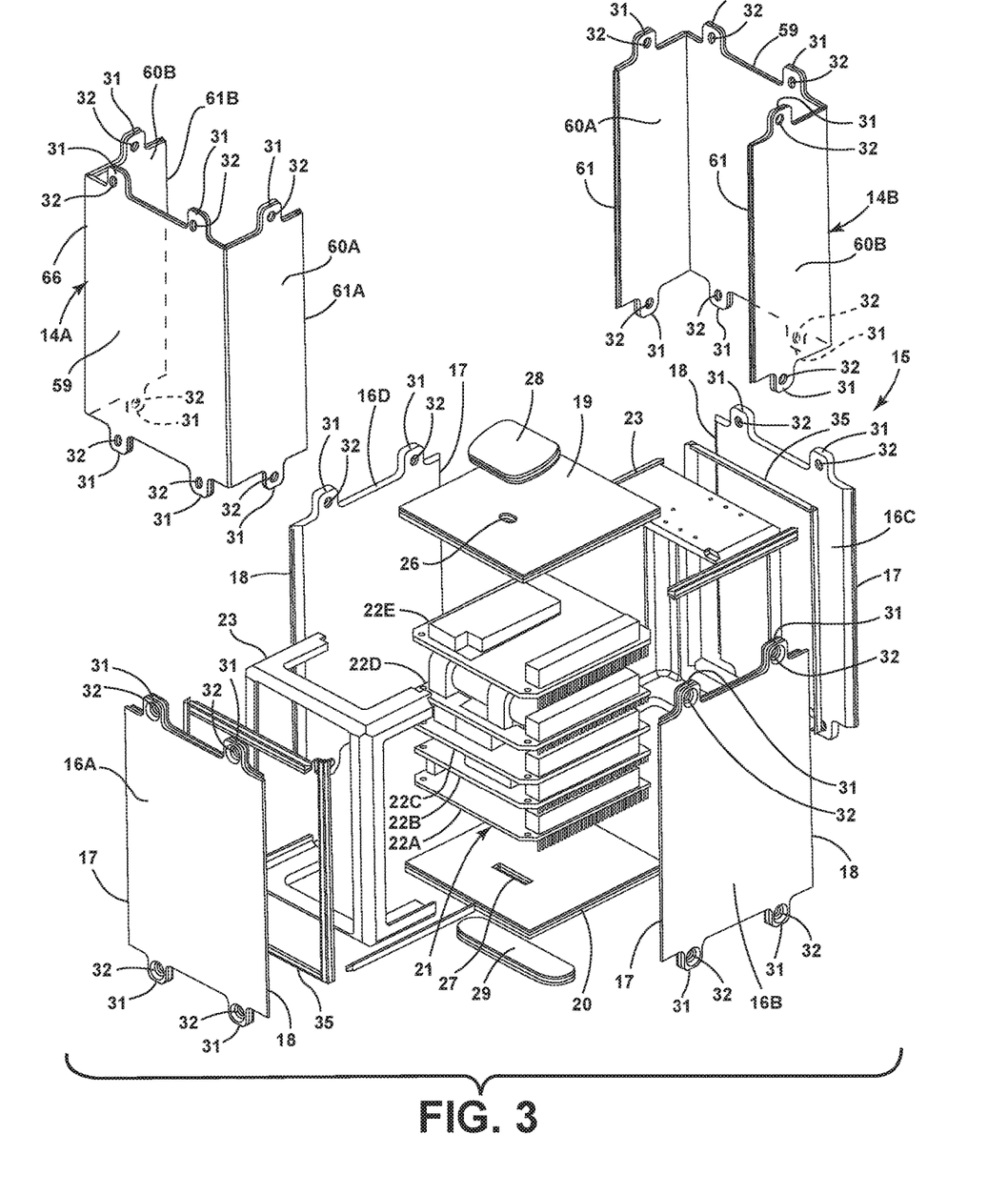
FIG. 3 is an exploded isometric view of a portion of the radiation-shielded device showing a radiation-shielded vault, in accordance with one or more embodiments of the present disclosure.

With further reference to FIG. 3, radiation-shielded vault 15 may comprise four plates or panels 16A-16D that are interconnected along opposite edges 17 and 18. Alternatively, the vault structure 15 may be formed by a pair of clamshell members 14A and 14B having base walls 59 and end walls 60A and 60B that are interconnected along edges 61A and 61B. The radiation-shielded vault 15 may include an upper plate member 19, and a lower plate member 20 having openings 26 and 27, respectively, for pass-through of cables or the like. Plate members 28 and 29 may be secured to the upper and lower plates 19 and 20, respectively, by brackets (not shown) to prevent a line-of-sight radiation through openings 26 and 27. The plate members 16A-16D, 14A and 14B, 19 and 20, and 28 and 29, may have a layered construction including one or more layers of tantalum, titanium, and aluminum as discussed in more detail below in connection with FIGS. 4 and 5.

The vault structure 15 may optionally include elongated corner members 35 that may be fabricated from high Z materials such as tantalum and/or titanium. Corner members 35 may include a layer of aluminum alloy to provide additional radiation shielding along the joints between adjacent panels or plates 16A-16D and/or 19 and 20. A plurality of internal components 21 such as electronics cards 22A-22E may be secured to the panels or plates 16A-16D (or clamshell members 14A and 14B) by an internal mounting structure 23. The panels or plates 16A-16D provide a rigid outer structure that forms a radiation-shielded interior space within vault structure 15, and also provides significant structural support for various internal components 21. Thus, the internal components 21, such as electronics cards 22A-22E, do not need to be individually radiation shielded.

Figures 4, 5:
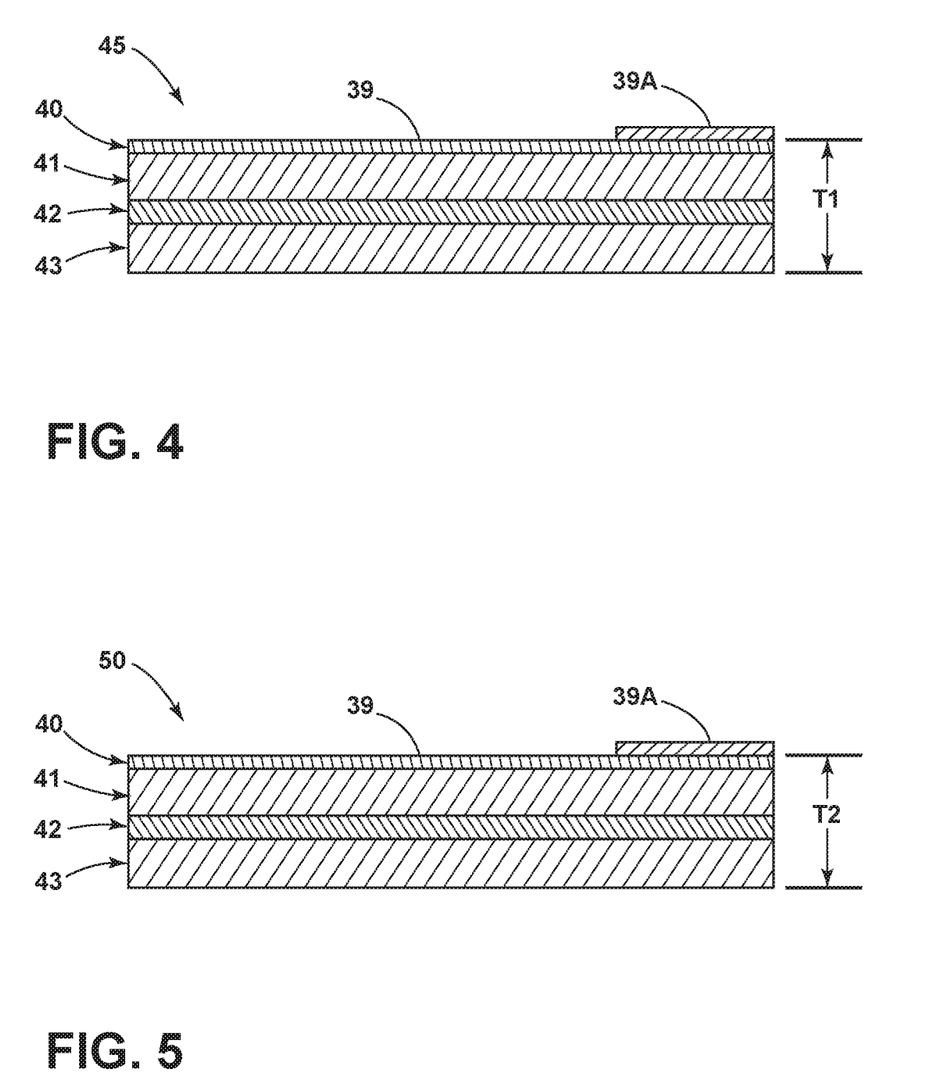
FIG. 4 is a cross-sectional view of a radiation-shielded structure, in accordance with one or more embodiments of the present disclosure.
FIG. 5 is a cross-sectional view of a radiation-shielded structure, in accordance with one or more embodiments of the present disclosure.

With reference to FIG. 4, the panels or plates 16A-16D and/or 19 and 20 may have a first layup configuration 45 including a layer of aluminum alloy 40, a first layer of titanium 41, a layer of tantalum 42, and a second layer of titanium 43. In the layup 45, the aluminum alloy layer 40 has a thickness of about 0.010 inches, the first titanium layer 41 has a thickness of about 0.030 inches, the tantalum layer 42 has a thickness of about 0.010 inches, and the second layer of titanium 43 has a thickness of about 0.030 inches. Thus, the total thickness "T1" of the layup 45 is about 0.080 inches. Outer surface 39 of aluminum alloy layer 40 may optionally include a portion 39A that is anodized (see also FIG. 2). As discussed below in connection with Table 1, the layup 45 has an areal density of about 1.13 g/cm$^2$.

With further reference to FIG. 5, a second layup 50 includes a first layer of aluminum alloy 40 having a thickness of about 0.005 inches. The layup 50 includes a first titanium layer 41 having a thickness of about 0.030 inches, a tantalum layer 42 having a thickness of about 0.020 inches, and a second titanium layer 43 having a thickness of about 0.025 inches. As discussed below in connection with Table 1, the layup 50 has an areal density of about 1.53 g/cm$^2$.

Figure 6:
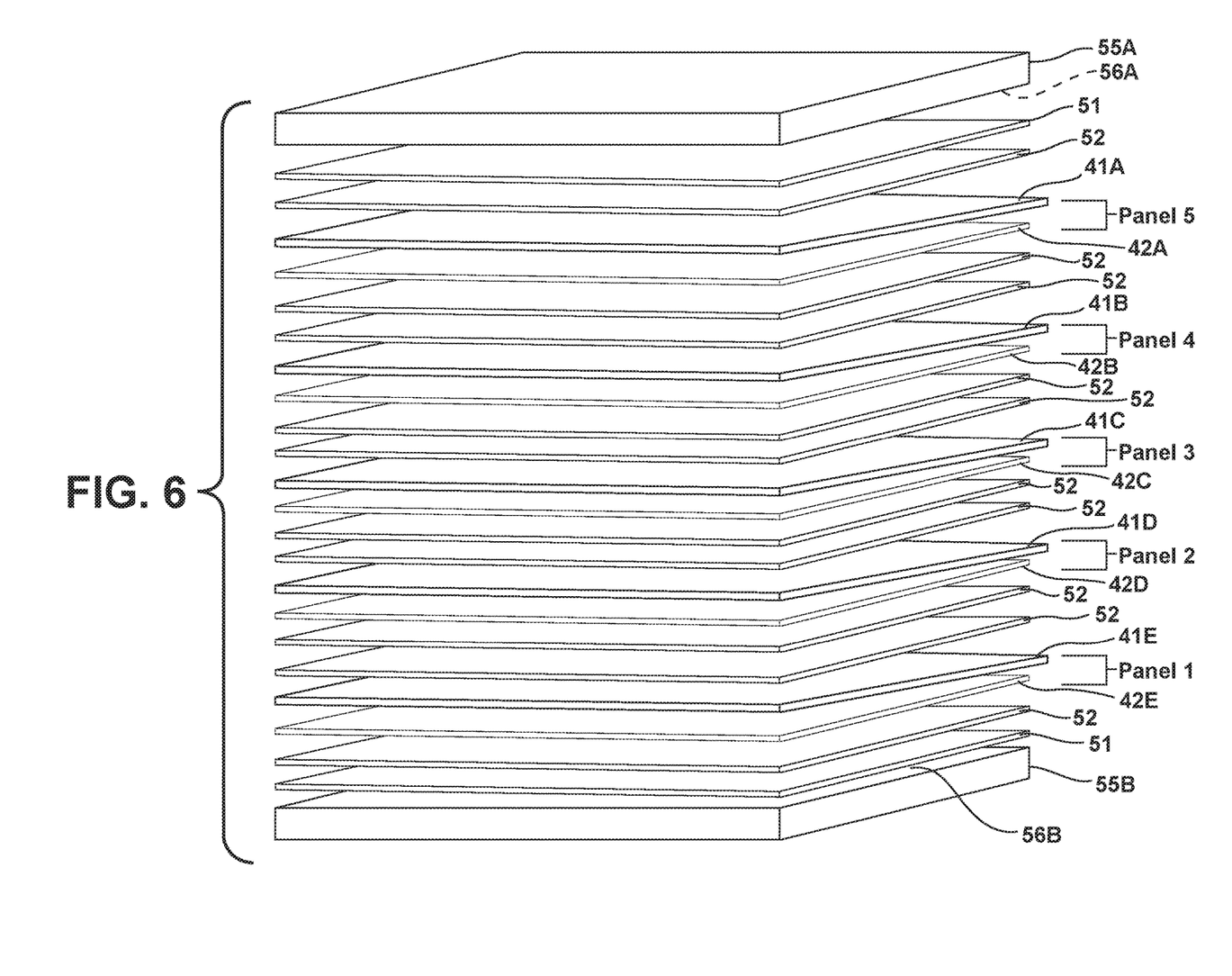
FIG. 6 is a partially schematic isometric exploded view of a tool and process for simultaneously forming radiation-shielded panel members, in accordance with one or more embodiments of the present disclosure.

With reference to FIG. 6, the layers of tantalum 42 may be diffusion bonded between the layers of titanium 41 and 43, respectively, utilizing a high temperature vacuum diffusion bonding process as disclosed in U.S. Patent Application Publication No. 2017/0032857 entitled, "Atomic Number (Z) Grade Shielding Materials and Methods of Making Atomic Number (Z) Grade Shielding." The titanium layers 41 and 43 are preferably substantially the same thickness or approximately the same thickness to thereby reduce or eliminate warping or other thermal distortion that could otherwise result from different coefficients of thermal expansion and temperature changes in the materials. The aluminum alloy layer 40 is preferably relatively thin to thereby minimize the thermal distortion effects that may result from the asymmetry of layups 45 and 50 due to aluminum alloy layer 40. Alternatively, if the titanium layers 41 and 43 do not have equal thicknesses (e.g., FIG. 5), the thickness of the aluminum alloy layer 40 may be adjusted to counteract thermal distortions that could otherwise be caused by the differences of thicknesses of the titanium layers 41 and 43. After the tantalum layer 42 is diffusion bonded between layers 41 and 43 of titanium, the layer of aluminum alloy 40 may be secured to titanium layer 41 utilizing a low temperature brazing process. The low temperature brazing process minimizes or eliminates warping or other thermal distortion that could result from high temperature processes.

Referring again to FIG. 6, a plurality of Panels 1-5 (e.g., panels/plates 16A-16D and/or panels/plates 19 and 20) may be simultaneously formed in a diffusion bonding process between a pair of tools 55A and 55B. The tools 55A and 55B may comprise flat plate-like members made from Inconel or other suitable material having surfaces 56A and 56B, respectively, that are flat. However, it will be understood that the radiation-shielded plates or panels may have non-planar shapes (e.g. curved) that may be formed utilizing tools 55A and 55B having non-planar surfaces 56A and 56B. As shown in FIG. 6, layers of Molybdenum (Moly) foil 51 may be positioned against surfaces 56A and 56B of tools 55A and 55B, respectively. The Moly foil 51 has a thickness of about 0.01 inches. Additional layers of Moly foil 52 that have been coated with boron nitride ("BN") may be utilized on opposite sides of Panels 1-5 as shown in FIG. 6. In the illustrated example, Panel 1 comprises a layer of titanium 41A having a thickness of about 0.060 inches and a layer of tantalum 42A having a thickness of about 0.041 inches. Panel 2 comprises a titanium layer 41B having a thickness of about 0.060 inches and a layer of tantalum 42B having a thickness of about 0.040 inches. Panel 3 comprises a layer of titanium 41C having a thickness of about 0.060 inches, and a layer of tantalum 42C having a thickness of about 0.041 inches. Panel 4 comprises a layer of titanium 41D having a thickness of about 0.060 inches, and a layer of tantalum 42D having a thickness of about 0.040 inches. Panel 5 comprises a layer of titanium 41E having a thickness of about 0.060 inches, and a layer of tantalum 42E having a thickness of about 0.041 inches.

In the example of FIG. 6, the layers of titanium may comprise a Ti 6-4 alloy or other suitable alloy. The tantalum may comprise an alloy that includes, for example, tungsten and/or titanium, and the aluminum may comprise a suitable known aluminum alloy. The titanium and tantalum layers may comprise plies having a square perimeter of about, for example, 6.0 inches by 6.0 inches. After the layers of titanium and tantalum are bonded utilizing a high temperature vacuum press diffusion process, an additional layer of titanium may be bonded to an opposite side of the tantalum layer in a second high temperature vacuum press diffusion bonding process that is substantially similar to the process utilized to initially bond a titanium layer to tantalum layer. More specifically, an additional layer of titanium may be inserted on an opposite side of tantalum layers 42A-42E in FIG. 6 after the first titanium layers 41A-41E are bonded to the tantalum layers 42A-42E, respectively. Alternatively, a pair of tantalum sheets may be simultaneously bonded to opposite sides of the tantalum sheets 42A-42E.

The panels or plates utilized to form radiation-shielded vault 15 may have various "Z-shields" constructions as shown in Tables 1 and 2. In Tables 1 and 2, "e" denotes electron dose (radiation), and "p" denotes proton dose (radiation). Specific thicknesses of high and low Z materials may be utilized to provide a required level of radiation shielding for a specific application (e.g. radiation environment of radiation-shielded device 1).

TABLE 1

| Sphere | Areal Density (g/cm$^2$) | Thickness (mil) | Total Ionizing Dose (Rads/yr) | Approx. Lifetime | Est. 1U mass (Kg) | Est. Ta Cost ($) | Key Features |
|---|---|---|---|---|---|---|---|
| Z-Shields 20 milTa | 1.53 | 80 (5Al/30Ti/ 20Ta/25Ti) | 183 (15 e) | 5.5-27.5 years | 0.91 | 2400 | Further e-s reduction per yr. Keeps anodized Al rail requirement for dispenser. 80 mil is the limit for adding shielding without adjusting the dimensions of the existing electronics card. |
| Z-Shields Light 10 milTa | 1.13 | 80 (10Al/30Ti/ 10Ta/30Ti) | 275 (95 e) | 3.6-18 years | 0.66 | 1250 | Least Ta areal density. Keeps anodized Al rail requirement for dispenser. Thinnest and Lightest of the Z-shields. Electron Radiation Significantly Minimized. Largest Performance enhancement versus price over 20x to Al/Ti and almost 100 times to Al with respect to thickness. 80 mil is the limit for adding shielding without adjusting the dimensions of the existing electronics cards. |
| Z-shields 40 milTa | 2.42 | 110 (10Al/30Ti/ | 146 Rads/yr | 7-17 years | 1.4 | 4100 | Mitigates internal charging effects. Keeps anodized Al |

TABLE 1-continued

| Sphere | Areal Density (g/cm²) | Thickness (mil) | Total Ionizing Dose (Rads/yr) | Approx. Lifetime | Est. 1U mass (Kg) | Est. Ta Cost ($) | Key Features |
|---|---|---|---|---|---|---|---|
| | | 40Ta/30Ti | (2 e's) | | | | rail requirement for dispenser. Existing electronic cards will fit with minimal adjustment. |
| Z-Shields 30 milTa | 1.99 | 100 (10Al/30Ti/ 30Ta/30Ti) | 155 Rads/yr | 7-17 years | 1.2 | 3500 | Mitigates internal charging effects. Keeps anodized Al rail requirement for dispenser. CubeSat Existing electronic cards will fit with minimal adjustment. |

TABLE 2

| Slab | Areal Density (g/cm²) | Thickness (mil) | Total Ionizing Dose (Rads/yr) | Approx. Lifetime | Est. 1U mass (Kg) | Est. Ta Cost ($) | Key Features |
|---|---|---|---|---|---|---|---|
| Al78 mil | 0.534 | 78 | 27269 (773 p) (26496e) | 13-66 days | 0.320 | N/A | This is the commercial Al wall shielding thickness being offered in the commercial market. It offers basically no electron radiation protection. |
| Al (90 mil) | 0.617 | 90 | 260 (p) 8045 (e) 8305 total | 1-2 months | 0.36 | | Significant amount of electron radiation, which can cause internal charging of boards. |
| Al (110 mil) | 0.754 | 110 | 227 (p) 6623 (e) 6850 total | 2-4 months | 0.44 | | Significant amount of electron radiation, which can cause internal charging of boards. |
| Al5 mil | 0.899 | 80 | 5645 (257 p) (5388e) | 65-323 days | 0.54 | N/A | Keeps anodized Al rail requirement for dispenser. It is still a significant amount of radiation for commercial parts. |
| Al 10 mil Ti 80 mil | 0.991 (0.923 + 0.0686) | 90 | 94 (p) 1034 (e) 1128 total | 11-22 months | 0.58 | | |
| Al 10 mil Ti 100 mil | 1.222 (1.153 + 0.0686) | 110 | 88 (p) 833 (e) 921 total | 13-26 months | 0.71 | | Almost 1000 rads/yr. It is still a significant amount of radiation for commercial parts. |

The areal densities listed in Table 1 are calculated utilizing a spherical model of the vault. The areal densities listed in Table 2 are calculated utilizing a "slab model" to more accurately determine the radiation shielding of the flat components utilized to form the vault 15 (see FIG. 3).

The materials preferably provide an areal density of at least about 0.5 g/cm², 0-8 g/cm², or more, as shown in Tables 1 and 2.

The electronics cards 22A-22E (FIG. 3) may have predefined sizes. Also, the dimensions of the dispenser 2 (FIG. 1) may also be predefined. As a result of these interior and exterior size restrictions, the plate or panel members 16A-16D preferably have a maximum thickness of about 0.080 inches. However, panels 16A-16D having somewhat increased thickness may be utilized if a greater level of radiation protection is required. Layups 5 and 6 of Table 1 are examples of thicker constructions. If panels 16A-16D having thicknesses greater than 0.080 inches are utilized to construct a vault 15, the inner surfaces of the panels 16A-16D may include shallow grooves to accommodate the edges of the electronics cards 22A-22E. Table 2 includes various layups having a thickness greater than 0.080 inches. These layups may be utilized to provide additional radiation shielding as may be required for a particular application. In general, the thicknesses of the aluminum, titanium, and tantalum layers can be varied as required to provide a specific degree of radiation shielding as may be required for a particular application.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of making a radiation-shielded structural enclosure member, the method comprising:
    bonding first and second layers of a first material onto first and second opposite sides, respectively, of a third layer of a second material;
    securing a fourth layer of a third material to at least one of the first and second layers of the first material to form a structural enclosure member having an areal density of at least about 0.50 g/cm² and a thickness of no more than about 0.11 inches.

2. The method of claim 1, wherein:
the first and second layers of the first material have substantially equal thicknesses.

3. The method of claim 1, wherein
the first material has a first density (g/cm³);
the second material has a second density that is greater than the first density; and
the third material has a third density that is less than the first density.

4. The method of claim 3, wherein
the first material comprises titanium;
the second material comprises tantalum; and
the third material comprises aluminum.

5. The method of claim 3, wherein:
the first material is bonded to the second material utilizing a high temperature vacuum diffusion bonding process; and
the third material is bonded to the first material utilizing a high temperature vacuum diffusion bonding process having a lower temperature than the high temperature vacuum diffusion bonding process.

6. The method of claim 3, wherein:
the third layer of the second material is about 0.010 inches thick.

7. The method of claim 5, wherein:
the first and second layers of the first material are about 0.030 inches thick; and
the fourth layer of the third material is about 0.010 inches thick.

8. The method of claim 1, wherein:
the areal density of the structural enclosure member is at least about 1.1 g/cm².

9. The method of claim 3, wherein:
the third layer of the second material is about 0.020 inches thick;
the thickness of the structural enclosure member is about 0.080 inches or less; and
the areal density of the structural enclosure member is at least about 1.5 g/cm².

10. The method of claim 3, including:
anodizing at least a portion of an outer surface of the third material.

11. The method of claim 3, wherein:
the layer of the third material is secured to at least one of the first and second layers of the first material utilizing a brazing process.

12. The method of claim 3, including:
forming a plurality of structural enclosure members, each having a layer of the second material disposed between a layer of the first material and an outer layer of the third material; and
interconnecting the structural enclosure members with the outer layer facing outwardly to form a radiation-shielded vault structure having a radiation-shielded internal space.

13. The method of claim 12, including:
securing at least one electronics component to the radiation-shielded vault structure with the at least one electronics component being positioned in the radiation-shielded internal space.

14. The method of claim 1, wherein:
the structural enclosure member comprises a flat plate member with substantially uniform thickness.

15. A method of claim 1, further comprising:
providing the first, second, and third layers, wherein the first second and third layers are separated from each other when provided and prior to the bonding of the first and second layers.

16. A radiation-shielded structure, comprising:
a shell comprising a first layer of a second material disposed between second and third layers of a first material that are bonded to the second material;
portion of the shell including a layer comprising a third material covering at least a portion of the third layer of the first material, the shell having an areal density of at least about 0.50 g/cm² and defining a radiation-shielded interior space.

17. The radiation-shielded structure of claim 16, wherein
the first material has a first density (g/cm³);
the second material has a second density that is greater than the first density; and
the third material has a third density that is less than the first density.

18. The radiation-shielded. structure of claim 17, wherein:
the first material comprises titanium;
the second material comprises tantalum; and
the third material comprises an aluminum alloy.

19. The radiation-shielded structure of claim 18, wherein:
the layer of second material is about 0.010-0.020 inches thick; and
the second and third layers of titanium are about 0.030 inches thick.

20. The radiation-shielded structure of claim 18, wherein:
the shell has a thickness of about 0.080 inches or less; and
the shell includes four generally planar outer surfaces forming four elongated corners;
at least a portion Of the aluminum alloy adjacent the four elongated corners is anodized.

21. The radiation-shielded structure of claim 17, wherein:
the first material comprises a first metallic element having a first atomic number; and
the second material comprises a second metallic element having a second atomic number that is greater than the first atomic number.

22. The radiation-shielded structure of claim 21, wherein the first material comprises titanium.

23. The radiation-shielded structure of claim 22, wherein the second material comprises tantalum.

24. The radiation-shielded structure of claim 21, wherein the second material comprises tantalum.

25. The radiation-shielded structure of claim 16, wherein:
the at. least one layer of the second material is diffusion bonded to the second and third layers of the first material.

* * * * *